United States Patent [19]

Ohta et al.

[11] 4,117,510
[45] Sep. 26, 1978

[54] SOLID STATE COLOR IMAGING APPARATUS

[75] Inventors: Yoshio Ohta, Hirakata; Toshiro Matsuura, Moriguchi; Ryuhei Nakabe, Hirakata, all of Japan

[73] Assignee: Matsushita Electric Industrial Co., Ltd., Japan

[21] Appl. No.: 615,885

[22] Filed: Sep. 23, 1975

[30] Foreign Application Priority Data

| Sep. 25, 1974 [JP] | Japan | 49-110871 |
| Sep. 25, 1974 [JP] | Japan | 49-110872 |
| Sep. 25, 1974 [JP] | Japan | 49-110873 |
| Nov. 12, 1974 [JP] | Japan | 49-130839 |

[51] Int. Cl.$^2$ .............................................. H04N 9/07
[52] U.S. Cl. .................................... 358/44; 358/48
[58] Field of Search .................. 358/41, 44, 48, 55, 358/45–47, 212, 213; 178/7.1; 357/24, 30; 250/570, 221 J, 226; 350/162 SF

[56] References Cited

U.S. PATENT DOCUMENTS

| 2,634,328 | 4/1953 | Goodale et al. | 358/48 |
| 2,689,270 | 9/1954 | Weimer | 358/48 |
| 2,797,257 | 6/1957 | Law | 358/55 |
| 3,472,948 | 10/1969 | Hecker | 358/48 |
| 3,502,289 | 1/1976 | Chai | 178/7.1 |
| 3,801,884 | 4/1974 | Sequin | 307/221 D |
| 3,909,520 | 9/1975 | Mend et al. | 178/7.1 |
| 3,982,274 | 9/1976 | Chai | 358/41 |

OTHER PUBLICATIONS

Watson, "Charge-Coupling Technology Leads to Compact Video Cameras," Bell Laboratories Record, vol. 51, No. 9, Oct. 1973, pp. 266–271.

Primary Examiner—John C. Martin
Attorney, Agent, or Firm—Wenderoth, Lind & Ponack

[57] ABSTRACT

Solid state color imaging apparatus for producing a color video signal representing an optical image of an object. In this apparatus, a plurality of sets of horizontal lines of photosensitive elements are arranged one above the other in a vertical scanning direction, each of which photosensitive element lines consists of a plurality of photosensitive elements distributed in a line in a horizontal scanning direction. Charge signals are read out from the sets of photosensitive element lines in each horizontal scanning period and a set of output signals is processed to produce the color video signal.

15 Claims, 15 Drawing Figures

SOLID STATE COLOR IMAGING APPARATUS

BACKGROUND OF THE INVENTION

This invention relates to a solid state color imaging apparatus employing a charge transfer device such as a CCD (Charge Coupled Device) and a BBD (Bucket Brigade Device) or a photodiode array, and in particular to such apparatus which senses and stores charges in proportion to an incident light and provides a sequential color video signal.

An area imaging apparatus employing a photodiode array is shown, for instance, in the WESCON Technical papers, session 13-2, Aug. 1967. It consists of photodiodes (or phototransistors), switching elements such as MOS transistors and scanning shift registers. In such apparatus, an electric charge which is proportional to the intensity of the light incident upon each photodiode and is stored therein is read out, when the switching element which is connected to the said photodiode is turned on by being accessed both with a vertical scanning shift register and a horizontal scanning shift register. A sequential video signal representing a black and white image of an object is obtained as an output of this apparatus.

With respect to an area imaging apparatus which operates by means of charge transfer, three methods, the frame transfer method, the inter line transfer method and the horizontal line transfer method have been proposed. An area imaging apparatus employing the frame transfer method is shown, for instance, in IEEE Trans. on Electron Dev. ED - 20, No. 3, p 244, 1973. Such frame transfer imaging apparatus consists of a photosensitive CCD array, a temporary storage CCD array and an output CCD register. A charge image which represents an input optical image and formed by the entirety of the charges stored during one field interval at MIS elements of the photosensitive array is transferred into the temporary storage array during a vertical blanking period. Then it is shifted one horizontal line at a time into the output register during a horizontal blanking period, and read out by a high speed horizontal clock to produce the sequential video signal.

An imaging apparatus employing the inter line transfer method, which is shown, for instance, in 1974 IEEE Intercon Technical Papers, Session 2 — 2, consists of alternate columns of photosensitive elements, vertical transfer CCD registers and an output CCD register. During a vertical blanking period, signal charges detected by the photosensitive elements are transferred into the vertical transfer registers. These signal charges are then shifted one horizontal line at a time into the output register during a horizontal blanking period, and transferred out by a horizontal clock.

A horizontal line transfer imaging apparatus which is shown, for instance, in RCA Review, vol. 33, September 1972, pp 483 - 500, consists of a parallel array of photosensitive BBD registers, an output BBD register and a vertical scan generator. The signal charges representing one horizontal line signal are transferred by a high speed horizontal clock into the output register and read out therefrom by a high speed clock under the control of the vertical scan generator.

Figure 1:
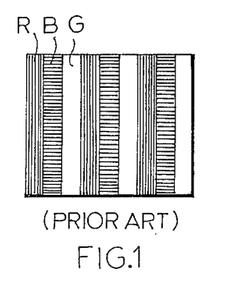
FIG. 1 is a diagram showing a striped color filter which may be additionally employed in an area imaging apparatus of the prior art for generating a color video signal.

A solid state color imaging apparatus with a single area imaging device may be constructed using any one of the abovementioned solid state imaging apparatuses by additionally employing a striped color filter which is shown in FIG. 1 and a color signal recovering circuit.

The striped color filter in FIG. 1 consists of a plurality of sets of striped color filter elements shown as R, B and G which pass the red, blue and green components, respectively, of the optical color image. Such a color filter may be put on the photosensitive area of the imaging apparatus (assume it is a frame transfer imaging apparatus) so that the direction of the repetition of the color filter elements is identical with that of the horizontal charge transfer and each color filter element may cover one photosensitive element in the direction of the horizontal scan or charge transfer. In this apparatus, one horizontal line of signal charges, which represents the red, blue and green signal alternately, is transferred out by the horizontal clock during the horizontal scanning period through the output CCD register. Then, the red, blue and green component signals are obtained from the sequential output of the output register through the sampling circuit which operates synchronously with the high speed horizontal clock and separates them from each other. These color component signals are processed to produce a color video signal.

It is known that the required frequency $f_H$ of the horizontal clock is expressed as; $f_H = N/T_H$, where N is the number of photosensitive elements which are arranged in the direction of the horizontal scan, and $T_H$ is the horizontal scanning period in seconds. To obtain an adequate resolution for a television camera N should be chosen to be more than 400 and $f_H$ should be 8 $MH_z$ or higher. Moreover, in case of the abovementioned solid state color imaging apparatus, $f_H$ should be higher than for the monochrome apparatus to secure the same resolution. Such color imaging apparatus requires the output CCD register or the horizontal scanning shift register to be operable under the control of about a 12 – 20 $MH_z$ clock. However, it is extremely difficult to put such a high speed register to practical use.

SUMMARY OF THE INVENTION

An object of the present invention, therefore, is to provide a solid state color imaging apparatus which does not require such an extremely high speed register.

Another object of the present invention is to provide a practical solid state color imaging apparatus which is adapted for a small size, light-weight and long-life color television camera system.

A further object of the present invention is to provide a solid state color imaging apparatus employing one black and white area imaging device.

In accordance with the present invention, photosensitive means which consists of a plurality of sets of two or three photosensitive element lines each one of which consists of a plurality of photosensitive elements distributed in a line in a horizontal scanning direction, which sets are arranged one above the other in a repeating sequence in a vertical scanning direction. During one horizontal scanning period, signal charges detected by each set of photosensitive element lines are read out simultaneously to produce two or three sequential output signals. A color video signal is produced from these output signals by processing them properly. Since no photosensitive element is to be added in the direction of the horizontal scan, the color imaging apparatus of this invention does not require such an extremely high speed register to obtain an adequate resolution for a color television camera. An interlacing of this apparatus may be achieved by reading out different sets of photosensitive element lines which are shifted one line in the vertical scanning direction in alternate fields.

Other objects and advantages will be apparent from the following description of some practical embodiments of the invention.

DESCRIPTION OF THE PREFERRED EMBODIMENTS

Figure 2:
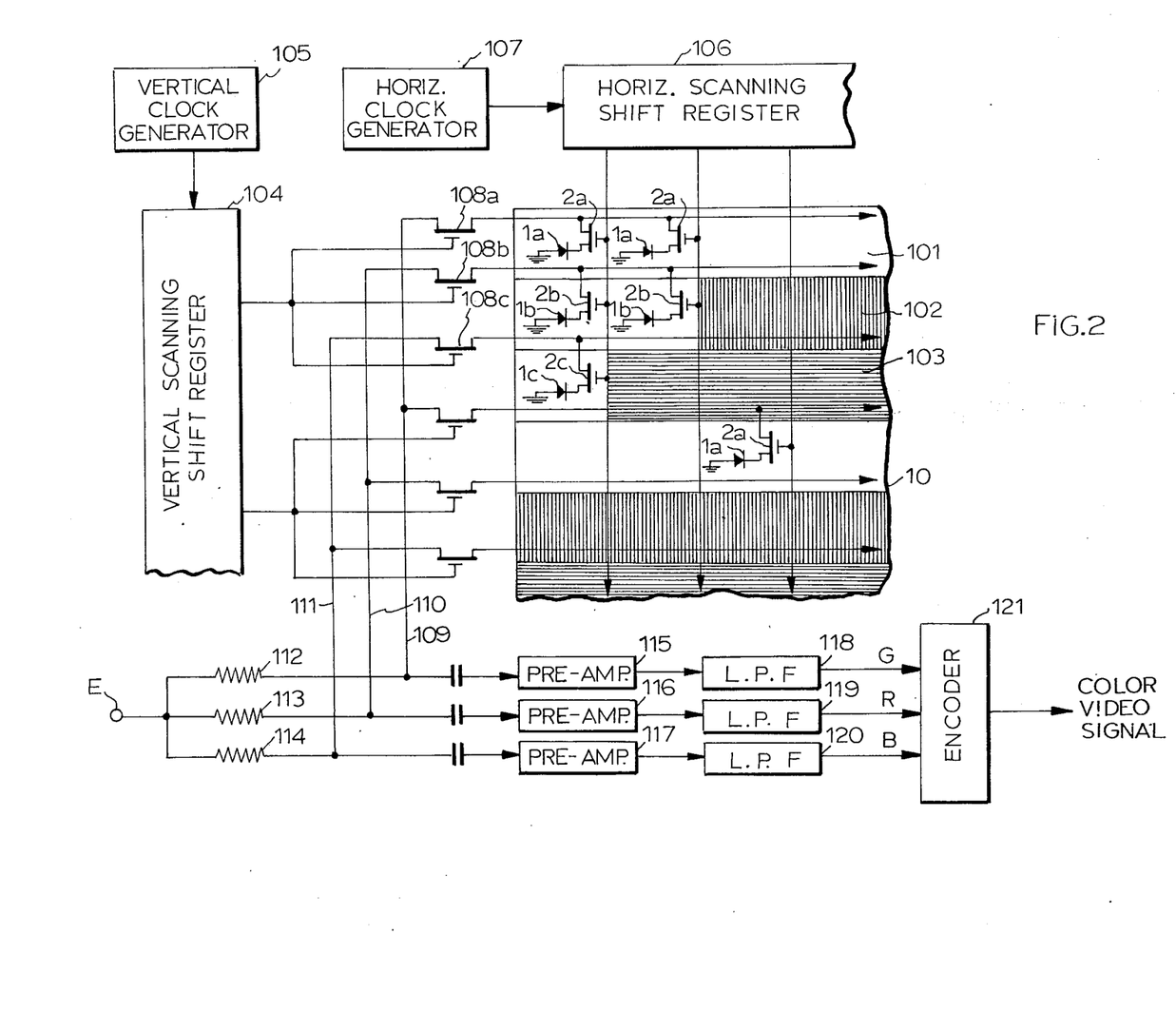
FIG. 2 is a block diagram showing the constitution of a first embodiment of a solid state color imaging apparatus according to this invention.
Figure 3:
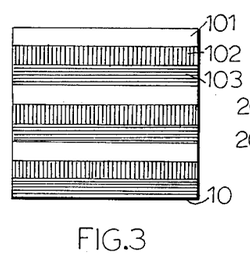
FIG. 3 is a diagram showing a striped color filter which is used in the imaging apparatus of FIG. 2.

FIG. 2 shows a block diagram of the first embodiment of the invention, which employs an X- Y address method. A photosensitive area of this solid state color imaging apparatus has the same constitution as that of a conventional X-Y address area imager, which consists of a plurality of photodiodes 1a, 1b and 1c and switching MOS transistors 2a, 2b and 2c. On this photosensing area, a striped color filter 10, shown in FIG. 3, is placed, so that each striped filter element 101, 102, 103 covers one line of photosensitive elements in the direction of a horizontal scan, such as shown in FIG. 2. The striped filter elements 101, 102 and 103 pass green, red and blue components of an optical image, respectively. Therefore, the charge diminutions in the photodiodes 1a, 1b and 1c caused by the photon flux incidence through the striped filter element represent green, red and blue information, respectively. Details of the photon flux integration mode are discussed, for instance, in the afore-cited WESCON Technical papers.

This photodiode array is scanned both with a vertical scanning shift register 104 driven by a vertical clock generator 105 and a horizontal scanning shift register 106 driven by a horizontal clock generator 107. In response to an output pulse of the vertical scanning shift register 104, each set of three switching MOS transistors 108a, 108b and 108c turn on, thus three lines are accessed at a time. Since switching transistors 108a, 108b and 108c are kept in the conductive state throughout the horizontal scanning period, green, red and blue component signals are derived simultaneously through separate output lines 109, 110 and 111, respectively, in synchronization with the successive clock pulse from the horizontal scanning shift register 106. The color component signals are amplified by pre-amplifiers 115, 116 and 117, have clock noise which is present therein removed by low-pass filters 118, 119 and 120, and then are processed in an encoder 121 to generate a color video signal such as the NTSC standard signal. Numerals 112, 113 and 114 in FIG. 2 represent detecting resistors for detecting the amount of recharging current, which corresponds to the diminution of the initial charge, and E represents a d-c voltage source.

According to this color imaging apparatus, the color information is formed not with three bits in the horizontal scanning direction but with those in the vertical scanning direction. The number of photosensitive elements which are aligned in the horizontal scanning direction is same as that of the black and white imaging apparatus of this type to obtain the same horizontal resolution. Therefore, this apparatus does not require such an extremely high speed shift register as the horizontal scanner, which should operate at more than a 12 MHz clock. In addition to this advantage, the increment of the photosensitive elements in the vertical scanning direction causes no severe requirement for the vertical scanning circuit which comprises the vertical clock generator 105, the vertical shift register 104 and the switching MOS transistors 108a, 108b and 108c.

A 2:1 interlacing of this apparatus may be achieved by reading out different sets of three lines of charge signals in alternate fields. For example, it can be achieved by reading out every two sets of three lines in the first field and the remaining sets in the second field. It can also be achieved effectively by the following method which is described in connection with the second embodiment shown in FIG. 4.

Figure 4:
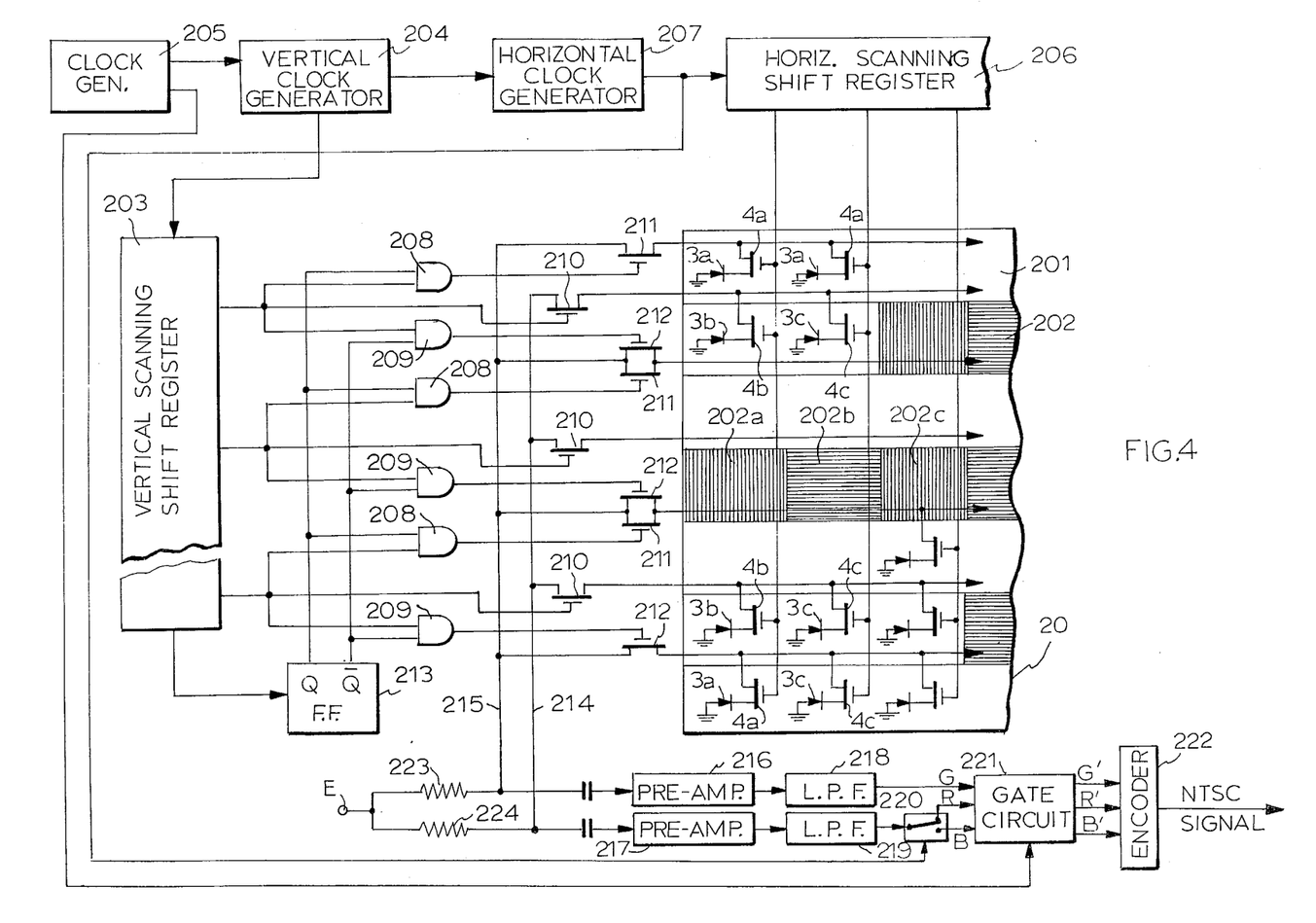
FIG. 4 is a block diagram showing the contitution of a second embodiment of a solid state imaging apparatus according to this invention.
Figure 5:
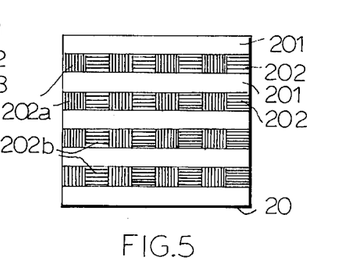
FIG. 5 is a diagram of a striped color filter which is used in the imaging apparatus in FIG. 4.

The solid state color imaging apparatus shown in FIG. 4 produces a color video signal not by deriving three color component signals, but by deriving two lines of output signals one of which represents a green component or a luminace of the image, and the other of which represents red and blue components alternately. The photosensitive area of this apparatus has the same construction as that of FIG. 2, in which 3a, 3b and 3c indicate photodiodes, and 4a, 4b and 4c indicate switching MOS transistors, respectively. FIG. 5 shows a striped color filter 20 employed in this apparatus, in which filter elements 201 are consecutive in a certain direction and pass the green light component or all color components, and filter elements 202 including red filter elements 202a for passing the red component and blue filter elements 202b for passing the blue component, which filter elements 202a and 202b are arranged alternately in the aforesaid direction. This striped color filter 20 is placed upon the photosensitive area so that aforesaid direction is in accord with the direction of the horizontal scan and each filter element covers one line of photodiodes.

A vertical scanning shift register 203 is driven by a vertical clock generator 204 under the control of clock generator 205, and a horizontal scanning shift register 206 is driven by a horizontal clock generator 207 in synchronization with the vertical clock. The output pulse of the vertical scanning register 203 is supplied to one of input gates of AND circuits 208 and 209 and a gate electrode of a switching MOS transistor 210 as well. To another input gate of the AND circuits 208 and 209, outputs Q and Q from a flip-flop circuit 213 are supplied, respectively, which flip-flop circuit changes its output mode at the end of each field in response to a scanning pluse from the vertical scanning register 203. The output terminals of the AND circuits 208 and 209 are connected respectively to gate electrodes of switching MOS transistors 211 and 212.

Supposing the output Q is high and Q is low in the first field, the AND circuits 208 are conductive in response to the scanning pulse from the vertical register 203 and the AND circuits 209 are kept nonconductive throughout this field irrespective of the scanning pulse. Since the MOS transistors 210 and 211 are conductive in accordance with the scanning pulse, two lines of charge signals, one of which is a first signal representing the green component or the luminance and another is a second signal representing the red and blue components alternately, are derived through output lines 214 and 215 when the switching MOS transistors 4a, 4b and 4c, and therefore the photodiodes 3a, 3b and 3c, are scanned with both the two scanning registers 203 and 206. The first and second signals are amplified by pre-amplifiers 216 and 217, and the clock noise is removed therefrom by low-pass filters 218 and 219, respectively. The second signal is then supplied to a switching circuit 220 which separates the red and blue component signals from each other in accordance with the horizontal clock pulse from the horizontal clock generator 207 or the pulse generated therefrom. Such switching circuit 220 can be constituted by a conventional high speed analog switch. The green component signal from the low-pass filter 218 and the red and blue component signals from the switching circuit 220 are supplied to a gate circuit 221 then to an encoder 222 to generate the color video signal. Numerals 223 and 224 designate resistors for detecting the recharging current.

When the signals are read out for the whole first field, the flip-flop 213 changes its output mode so that Q is low and Q is high in response to the output pulse from the vertical scanning shift register 203. As this output mode is maintained throughout the second field, the AND circuits 208 and switching MOS transistors 211 are nonconductive. Therefore, the AND circuit 209 turns on in the second field when the scanning pulse from the vertical scanning shift register 203 is supplied to the other gate. Since the switching MOS transistors 210 and 211 are in the conductive state during one horizontal scanning period, two lines of charge signals are derived simultaneously through the output lines 214 and 215, which two lines are shifted by one line from those in the first field. These two output signals are processed to produce the color video signal in the same manner as the first field.

Figure 6A:
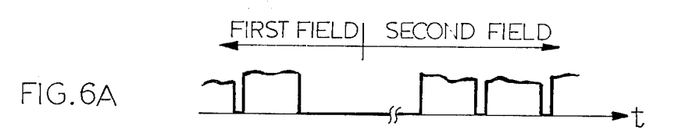
FIG. 6A, FIG. 6B and FIG. 6C are diagrams showing a wave shape of one of two sequential outputs from the imaging apparatus in FIG. 4, that of a vertical blanking pulse and that of a color signal in which an error information signal is removed, respectively.
Figure 6B:
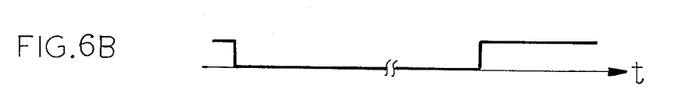
Figure 6C:
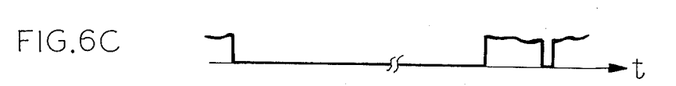

In this apparatus, detected signal charges are formed during one field interval. But those in the first line and the last line which represent the green component light or the luminance are read out once in the frame interval. Consequently, the last two line signals in the first field and the first ones in the second field contain error signals which are due to the longer charge storage time, that is one frame interval. Various ways can be provided in order that such line signals are not reproduced on a color television display device. One way is to operate the display device in the state of over scanning. Another way is to remove such line signals from the color video signal in the color television display device or in the imaging apparatus. The solid state color imaging apparatus in FIG. 4 includes the gate circuit 221 which removes the last line signals in the first field and the first line signals in the second field from the color component signals G, R and B, such as shown in FIG. 6A, in accordance with a gate pulse which is generated in the clock generator 205 and shown in FIG. 6B, to produce the color component signals G', R' and B', such as shown in FIG. 6C.

This method of achieving the 2:1 interlacing is readily adapted to the apparatus in FIG. 2, which produces three line signals at a time. To put it briefly, certain sets of three lines are read out in the first field and different sets which are shifted by either one line or two lines in the direction of the vertical scan are read out in the second field. Moreover, a 3:1 interlacing can be achieved by reading out each set of three lines in each field which is shifted by one line in such direction in successive fields.

According to this method, the 2:1 interlacing is achieved by providing only one additional line of photosensitive elements in the noninterlacing color imaging apparatus of this type.

Figure 7:
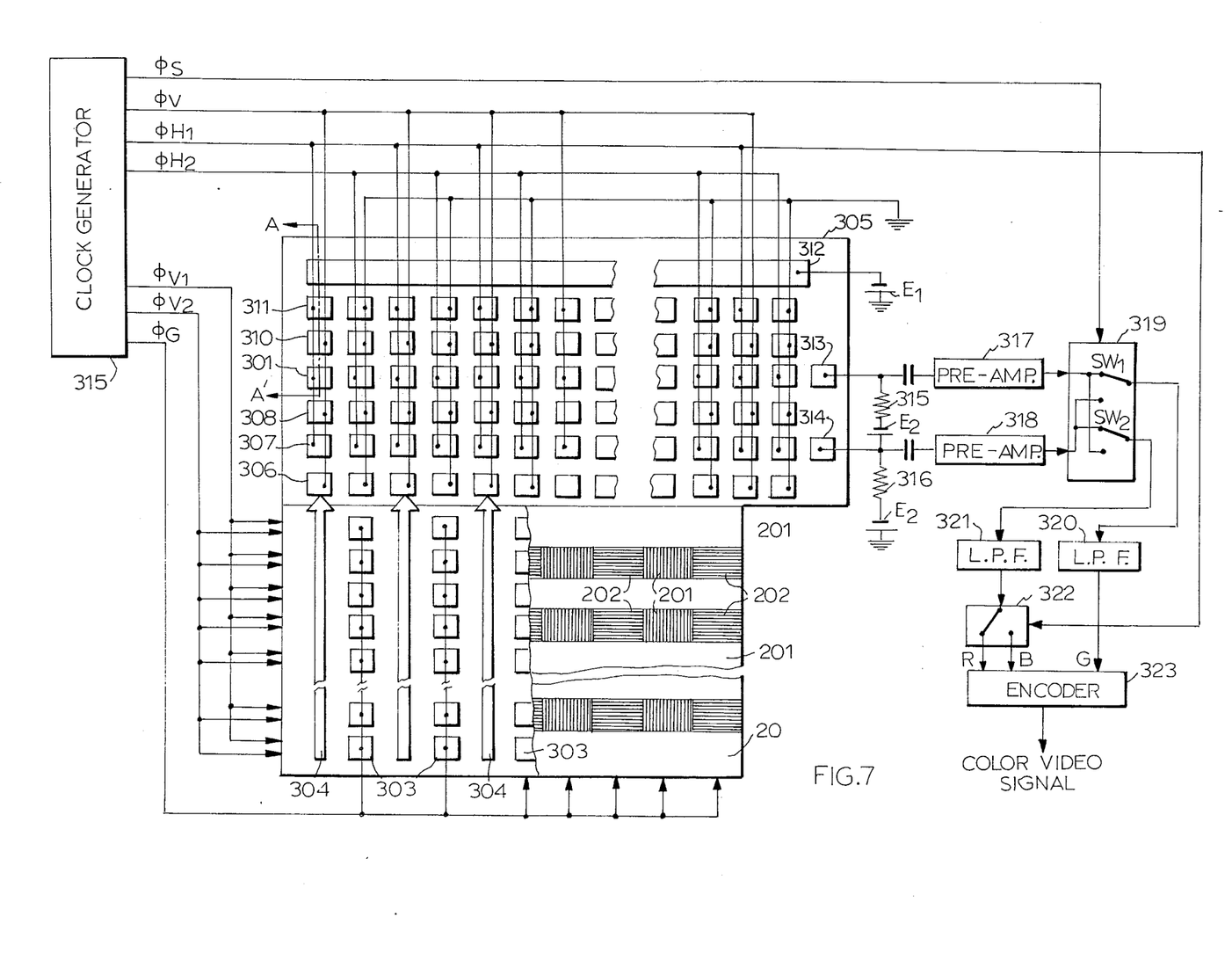
FIG. 7 is a block diagram showing the constitution of a third embodiment of a solid state imaging apparatus according to this invention.

FIG. 7 shows a third embodiment of the present invention, which employs a CCD imager based on the inter line transfer method. This solid state color imaging apparatus, therefore, consists of a plurality of photosensors 303, vertical transfer CCD registers 304, a horizontal transfer CCD register 305 with two parallel horizontal transfer channels under the control of a plurality of lines of transfer electrodes 306–311, an elimination region 312 and output electrodes 313 and 314, a clock generator 315, a process circuit and a striped color filter 20 as shown in FIG. 5. The striped color filter 20 is placed on the imaging array so that the aforementioned direction of the striped filter elements is in accord with the direction of the horizontal transfer or scan and each filter element covers one line of photosensors 303.

Figure 10:
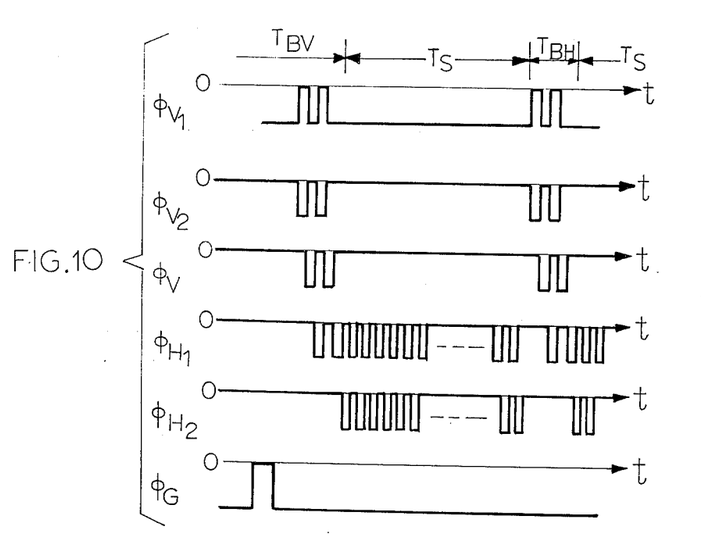
FIG. 10 is a diagram showing the wave shapes of transfer clock pulses and a gate pulse in the first field of the imaging apparatus in FIG. 7.

In this apparatus, the detected charges are stored during one field interval in the photosensors 303, such an MIS structure with gate electrodes, then transferred into corresponding positions of the vertical transfer channels 304 in accordance with the gate pulse $\phi_G$ shown in FIG. 10, in the vertical blanking period $T_{BV}$ of the first field. Supposing that all of the CCDs have an n-type silicon substrate, and operate with a two-phase clock signal, the detected charges are transferred into the vertical channels 304 from the vertical transfer electrodes where a vertical clock signed $\phi_{V1}$ is supplied which is kept at a certain negative voltage level during the vertical blanking period and horizontal scanning period as shown in FIG. 10.

Since the even numbered electrodes from the left of the lines of transfer electrodes 306, 308, 310 and 311 are always at zero volts and the horizontal clock signal $\phi_{H2}$ is zero, transfer channels are formed under by the odd numbered electrodes of lines of transfer electrodes 306–311 during the horizontal blanking period $T_{BH}$ and the vertical blanking period $T_{BV}$. The charge signals are shifted two lines at a time into the horizontal CCD register 305 from the odd number electrodes of lines of transfer electrodes 307 and 309 by the vertical transfer clock signals $\phi_{V1}$, $\phi_{V2}$ and $\phi_V$ and the horizontal clock pulse $\phi_{H1}$. At the end of these blanking periods, the level of signal $\phi_V$ rises to zero volts and is kept at this level throughout the next horizontal scanning period Ts. This results in forming parallel transfer channels in the lines of transfer electrodes 307 and 309. On the other hand, $\phi_{V1}$ is kept at a negative voltage level throughout the horizontal scanning period Ts to store the charge signals under at the vertical transfer electrodes signal $\phi_{V1}$ is supplied.

During the horizontal scanning period Ts, two lines of charge signals are transferred out simultaneously through the output electrodes 313 and 314 where bias voltage $E_2$ is supplied, under the control of the horizontal clock signals $\phi_{H1}$ and $\phi_{H2}$. A first signal derived from the electrode 313 represents the green light component or the luminance of the color image and a second signal from the electrode 314 represents the red and blue light components alternately. These signals are detected by detecting resistors 315 and 316 by way of current sensing, amplified by pre-amplifiers 317 and 318, and then supplied to a first switching circuit 319. The first switching circuit 319 includes a pair of switching elements $S_{W1}$ and $S_{W2}$ each of which has two input terminals where the outputs of the pre-amplifiers 317 and 318 are provided, respectively, and has one output terminal which is connected to one of the two input terminals throughout the field interval. This input-output connection mode changes in the alternate fields under the control of a switching pulse $\phi_S$ which is generated in the clock signal generator 315, so that elements $S_{W1}$ and $S_{W2}$ will always transmit the first signal and the second signal, respectively. The first and second signals are then processed in the same way as the apparatus in FIG. 4 by low-pass filters 320 and 321, a second switching circuit 322 which operates in the same manner as the switching circuit 220 in FIG. 4 in accordance with a clock signal $\phi_{H1}$ so as to separate the red and blue component signals from each other, and by an encoder 323 to produce the color video signal.

Figure 8:
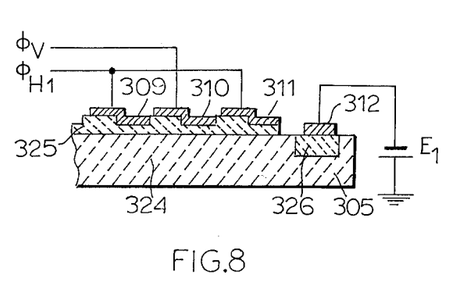
FIG. 8 is a diagram showing the constitution of a cross section of an output CCD register of the imaging apparatus in FIG. 7.
Figure 11:
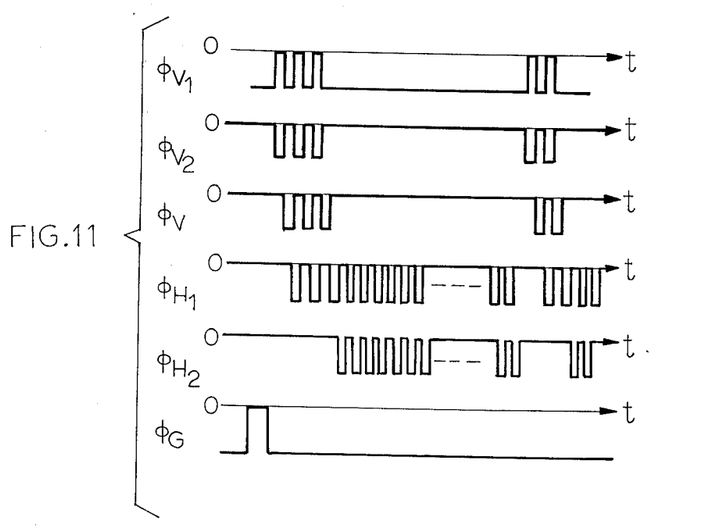
FIG. 11 is a diagram showing the wave shapes of transfer clock pulses and a gate pulse in the second field of the imaging apparatus in FIG. 7.

The 2:1 interlacing of this apparatus is achieved, for instance, by generating three cycles of pulses in transfer clock signals $\phi_{V1}$, $\phi_{V2}$, $\phi_V$ and $\phi_{H1}$ only in the vertical blanking period of the second field, as shown in FIG. 11. When the signal read-out is over in the first field, signal charges detected by the photosensors during the first field are transferred by the gate pulse $\phi_G$ into the vertical transfer channels by the transfer electrodes where signal $\phi_{V1}$ is supplied at the beginning of the second field. If the last line signal charges which have been transferred to the nearest positions in the horizontal registor 305 at the end of the first field remain there, the first line signal charges from the nearest photosensors to the horizontal register 305 are mixed with them. These mixed chrages are removed through the elimination region 312 which has a p - n junction structure negatively biased with a d-c voltage $E_1$ when the third pulse appears in the clock signal $\phi_{H1}$. The structure of the elimination region 312 is shown in FIG. 8 which is a cross-sectional view taken along section lines A—A′ in FIG. 7, where numerals 324, 325 and 326 represent an n-type silicon substrate, an insulating layer and a p-type conductivity region, respectively. As the result, two lines of signal charges which are shifted by one line with respect to those of the first field are transferred into the horizontal transfer register 305 under by the odd numbered electrodes of the lines of transfer electrodes 307 and 309 in the same way as for the first field. Then they are transferred out by the horizontal clock signals $\phi_{H1}$ and $\phi_{H2}$ shown in FIG. 11 simultaneously through the output electrodes 313 and 314. The first signal which is derived through the output electrode 314 and represents the green light component or the luminance of the color image is transmitted to the low-pass filter 320 by the switching element $S_{W1}$ in the first switching circuit 319. The second signal which is derived through the output electrode 313 and represents the red and blue light components alternately transmitted to low-pass filter 321 by the switching element $S_{W2}$. Then they are processed in the same way as the signals for the first field to produce the color video signal.

Figure 9:
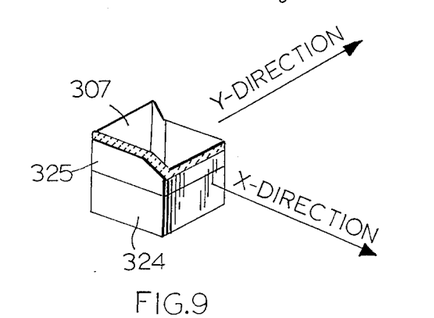
FIG. 9 is a diagram showing the constitution of a cross section of one MIS structure of an output CCD register in FIG. 7.

In the horizontal register 305, each odd number MIS structure from the left of the two transfer channels should have two transfer directions; i.e. a vertical transfer direction (Y-direction) and a horizontal one (X-direction). One example of such an MIS structure is shown in FIG. 9, which has a stepped insulating layer configuration in both directions. The thickness of the insulating layer of the MIS structure, the electrode of which is always kept zero volts, can be uniform because it functions as a channel stopper. With respect to other MIS structures, they have a stepped insulating layer configuration in each one of the transfer directions.

Considering the blooming problem, this embodiment can be arranged so that the charge mixing in the second field is not caused. This is achieved by reading out whole signal charges in the first field. In this case, only one cycle pulse is produced in the vertical transfer clock signals $\phi_{V1}$, $\phi_{V2}$ and $\phi_V$ and the horizontal clock signal $\phi_{H1}$ only in the vertical blanking period $T_{BV}$ in order to shift the position of a pair of line signals by one line from that of the first field. The signals which are transferred out last in the first field and first in the second field are removed from the color video signal in the same manner as in the apparatus in FIG. 4.

In this apparatus, the frequencies of the horizontal clock signals $\phi_{H1}$ and $\phi_{H2}$ are no higher than in the conventional black and white solid state imaging apparatus. Furthermore, the increment of the photosensors and the CCD elements in the vertical scanning direction does not cause problems in the vertical scanning circuit, but only requires production of two cycles of the vertical transfer clock pulses in the horizontal blanking period $T_{BH}$.

Figure 12:
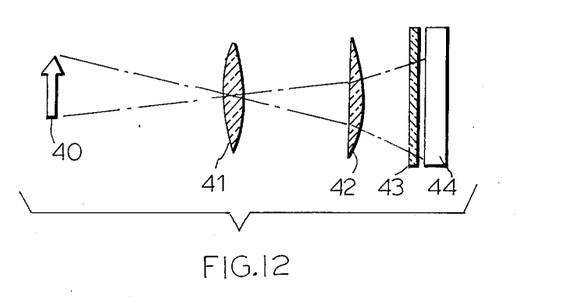
FIG. 12 is a diagram showing one example of an optical system adapted for a solid state color imaging apparatus according to this invention.
Figure 13:
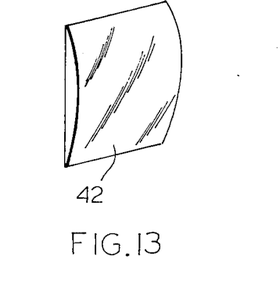
FIG. 13 is a diagram showing a semi-circular lens which is used in the optical system in FIG. 12.

If it is required to read out three output signals at a time in the color imaging apparatus which employs CCDs or BBDs and the striped color filter such as shown in FIG. 3, the vertical transfer clock signals $\phi_{V1}$, $\phi_{V2}$ and $\phi_V$ and the horizontal transfer clock signal $\phi_{H1}$ should have three cycle pulses in the blanking period and the horizontal register should include three parallel transfer channels. In the solid state color imaging apparatus described above, there is no increment of photosensitive elements in the direction of the horizontal scan in comparison with the black and white imaging apparatus, but the number of them in the direction of the vertical scan is twice or three times that in the black and white imaging apparatus. Therefore, if necessary, a semi-circular lens can be utilized to expand the optical image only in the direction of the vertical scan in order to improve the vertical resolution of this apparatus. FIG. 12 shows such an optical system in which a semi-circular lens 42, such as shown in FIG. 13, is disposed between a striped color filter 43 and a lens 41 which focuses the optical image of an object 40 upon a photosensitive array 44 through the striped color filter 43.

Although this invention has been particularly shown and described, it is contemplated that various changes and modifications may be made without departing in any way from the scope of this invention as set forth in the following claims. The embodiments of the invention in which an exclusive property or privilege is claimed are defined as follows.

We claim:

1. A solid state color imaging apparatus for producing a color video signal representing an optical image of an object, said apparatus comprising:

photosensitive means which consists of a plurality of photosensitive elements which are arranged substantially in line both in the horizontal and vertical scanning directions and color filter means consisting of a plurality of sets of color filter strips each of which overlies at least one line of said photosensitive elements in a horizontal scanning direction for producing a set of line signals, which sets are arranged in a repeating sequence in a vertical scanning direction;

first charge transfer means coupled to said photosensitive means for shifting charge signals from a set of photosensitive elements under one set of color filter strips at a time in a horizontal blanking period by vertical transfer clock signals for producing a set of line signals, which charge signals have been transferred thereto from said photosensitive means in a vertical blanking period;

second charge transfer means coupled to said first charge transfer means having a set of transfer channels for transferring out said charge signals one set at a time, which charge signals have been shifted thereinto from said first transfer means in said horizontal blanking period, in a horizontal scanning period by horizontal transfer clock signals for producing a set of output signals which correspond to said set of line signals; and processing circuit means coupled to said second charge transfer means for responding to said set of output signals which are derived through said set of transfer channels of said second charge transfer means for producing the color video signal.

2. A solid state color imaging apparatus as claimed in claim 1, wherein each set of said color filter strips consists of three lines of filter strips which have characteristics to pass different color light components of said optical image to form three sets of line signals, said first and second charge transfer means comprise means for transferring three lines of signals at a time, and said proce-sing circuit means comprises means for producing the color video signal in response to three output signals derived through said second charge transfer means.

3. A solid state color imaging apparatus as claimed in claim 1, wherein each set of said color filter strips consists of two lines of color filter strips one of which has characteristics to pass a first color and the other of which consists of alternate filter elements which have characteristics to pass a second and third colors, respectively, of said optical image, said first and second charge transfer means comprise means for transferring two lines of signals at a time to produce two lines of output signals, and said processing circuit means comprises a first circuit for responding to one of said output signals from under said one of said color filter strips for producing a first light component signal or luminance signal, a second circuit for responding to the other of said output signals from under said other of said color filter strips for producing a second light component signal and a third light component signal, and a third circuit coupled to said first and second circuits for processing said signal therefrom to produce the color video signal.

4. A solid state color imaging apparatus as claimed in claim 1, further comprising means for changing the number of cycles of said vertical transfer clock signals only at the first charge shifting of said first charge transfer means in each field, so that said second charge transfer means transfers out charge signals from different sets of photosensitive element lines which are shifted in the vertical scanning direction in alternate fields.

5. A solid state color imaging apparatus as claimed in claim 4, further comprising charge eliminating means coupled to said second charge transfer means for eliminating a line of signal charges which are shifted first into said second charge transfer means in a second field, and wherein the number of cycles of said vertical transfer clocks increase one cycle only at the first charge shifting of said second charge transfer means in the second field.

6. A solid state color imaging apparatus as claimed in claim 4, further comprising switching means coupled to said second charge transfer means for responding to said set of output signals derived from said second charge transfer means for transmitting them into each predetermined circuit, so that said output signals transmitted by said switching means always represent the same color components in alternate fields.

7. A solid state color imaging apparatus for producing a color video signal representing an optical image of an object, said apparatus comprising:

photosensitive means which consists of plurality of photosensitive elements which are arranged substantially in line both in the horizontal and vertical scanning directions and color filter means consisting of a plurality of sets of color filter strips each of which overlies at least one line of said photosensitive elements in line in the horizontal scanning direction, each set of said color filter strips consisting of two lines of color filter strips one of which has characteristics to pass a first color and the other of which consists of alternate filter elements which have characteristics to pass a second and third color, respectively, which sets are arranged in a repeating sequence in the vertical scanning direction;

first means coupled to said photosensitive means for reading out charge signals which are stored in said photosensitive elements from two lines of said photosensitive element lines at a time in synchronism with a clock pulse for producing two lines of output signals during each horizontal scanning period; and second means coupled to said first means for responding to said two lines of output signals for processing these output signals to produce the color video signal.

8. A solid state color imaging apparatus as claimed in claim 7, wherein said first color is a green light component of said optical image and said second and third colors are red and blue light components of said optical image, respectively, said first means being means for producing a first output signal representing the green light component or luminance of said optical image and a second output signal representing the red and blue light components alternately, and said second means comprises a first circuit for responding to said first output signal for producing a green component signal or luminance signal, a second circuit for responding to said second output signal for producing a red component signal and a blue component signal, and a third circuit coupled to said first and second circuits for producing the color video signal.

9. A solid state color imaging apparatus as claimed in claim 7, wherein each set of said color filter strips consists of two lines of color filter strips one of which has characteristics to pass all color components and the other of which consists of alternate filter elements which have characteristics to pass a second and third color, respectively, said first means being means for reading out said charge signals two lines at a time for producing two lines of output signals, and said second means being means for responding to said two lines of output signals to produce the color video signal.

10. A solid state color imaging apparatus as claimed in claim 9, wherein said first color is the luminance of said optical image and said second and third colors are red and blue light components of said optical image, respectively, said first means being means for producing a first output signal representing the green light component or luminance of said optical image and a second output signal representing the red and blue light components alternately, and said second means comprises a first circuit for responding to said first output signal for producing a green component signal or luminance signal, a second circuit for responding to said second output signal for producing a red component signal and a blue component signal, and a third circuit coupled to said first and second circuits for producing the color video signal.

11. A solid state color imaging apparatus for producing a color video signal representing an optical image of an object, said apparatus comprising:

photosensitive means which consists of plurality of photosensitive elements which are arranged substantially in line both in the horizontal and vertical scanning directions and color filter means consisting of a plurality of sets of color filter strips each of which overlies at least one line of said photosensitive elements in line in the horizontal scanning direction, which sets are arranged in a repeating sequence in the vertical scanning direction;

first means coupled to said photosensitive means for reading out said charge signals from under sets of said color filter strips at a time in successive fields during each horizontal scanning period, which sets are shifted by one line in the vertical scanning direction in said successive fields in synchronism with a clock pulse for producing a set of output signals during each horizontal scanning period; and second means coupled to said first means for responding to said set of output signals for processing these output signals to produce the color video signal.

12. A solid state color imaging apparatus as claimed in claim 11, wherein said first means comprises means for reading out said charge signals from under a first set of said color filter strips in a first field and from under a second set of said color filter strips which are shifted with respect to said first set by one line in the vertical scanning direction in a second field, whereby a 2:1 interlacing is achieved.

13. A solid state color imaging apparatus as claimed in claim 12, further comprising third means coupled to said first means for removing from said set of output signals the line signal which is read out during the last and the first horizontal scanning period in each field.

14. A solid state color imaging apparatus for producing a color video signal representing an optical image of an object, said apparatus comprising:

photosensitive means which consists of a plurality of photosensitive elements which are arranged substantially in line in the horizontal scanning direction and the vertical scanning direction and color filter means consisting of a plurality of sets of color filter strips each of which overlies at least one line of said photosensitive elements in a horizontal scanning direction, which sets are arranged in a repeating sequence in a vertical scanning direction;

vertical scanning means coupled to said photosensitive means for generating a vertical scanning pulse for accessing one set of lines of said photosensitive elements under one of said sets of color filter strips at a time, including a vertical scanning shift register, a first circuit coupled to said vertical scanning shift register for responding to a scanning pulse from said vertical scanning shift register for generating said vertical scanning pulse for accessing a plurality of lines of photosensitive elements under one set of color filter strips at a time, and a second circuit coupled to said photosensitive means for shifting position of said access of said lines of photosensitive elements by one line in alternate fields, horizontal scanning means coupled to said photosensitive means for generating a horizontal scanning pulse;

output circuit means through which a set of output signals are derived which correspond to charge signals stored in said photosensitive elements under said sets of color filter strips;

switching circuit means coupled between said photosensitive means and said output circuit means and to which said scanning means are connected for transmitting said charge signals one set at a time from said photosensitive elements to said output circuit means when both said vertical scanning pulse and said horizontal scanning pulse are supplied thereto; and processing circuit means coupled to said output circuit means for responding to said set of output signals from said output circuit means for processing them for producing the color video signal.

15. A solid state color imaging apparatus as claimed in claim 14, wherein said first circuit consists of first and second groups of AND circuits each of which AND circuits has two input gates, the AND circuits in the first group each being paired with an AND circuit in the second group, one input of the AND circuits of each pair being connected to a corresponding output terminal of said vertical scanning shift register, and a plurality of groups of switching elements, the elements of the first group of which are coupled to the AND circuits of the first group of AND circuits to turn on in accordance with an output from said first group of AND circuits, the elements of the second group of which are coupled to the AND circuits of the second group of AND circuit to turn on in accordance with an output from said second group of AND circuits, and the elements of the third group of which are coupled to said vertical scanning shift register to turn on in accordance with a scanning pulse from said corresponding output terminal of said vertical scanning shift register, and said second circuit consists of:

a flip-flop circuit which changes its output mode in a vertical blanking period and keeps it throughout a succeeding field;

and a circuit coupling one of the outputs of said flip-flop circuit to the other input gate of said AND circuits of said first group of AND circuits and coupling the other output of said flip-flop circuit to the other input gate of said AND circuits of said second group of AND circuits, whereby one of said first and second groups of AND circuits is in the conductive state in each field in order to shift positions of said set of photosensitive element lines by one line in alternate fields.

* * * * *